United States Patent
Ghosh et al.

(10) Patent No.: US 10,616,722 B2
(45) Date of Patent: Apr. 7, 2020

(54) LOCALIZATION IN MACHINE-TO-MACHINE SYSTEMS

(71) Applicant: Intel IP Corporation, Santa Clara, CA (US)

(72) Inventors: Chittabrata Chitto Ghosh, Fremont, CA (US); Hassnaa Moustafa, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/502,405

(22) Filed: Jul. 3, 2019

(65) Prior Publication Data

US 2020/0021947 A1    Jan. 16, 2020

Related U.S. Application Data

(63) Continuation of application No. 15/082,084, filed on Mar. 28, 2016, now Pat. No. 10,390,172.

(51) Int. Cl.
| | |
|---|---|
| *H04W 24/00* | (2009.01) |
| *H04W 4/029* | (2018.01) |
| *H04W 4/70* | (2018.01) |
| *H04L 29/08* | (2006.01) |
| *H04W 64/00* | (2009.01) |
| *H04W 4/02* | (2018.01) |

(52) U.S. Cl.
CPC ............. *H04W 4/029* (2018.02); *H04L 67/24* (2013.01); *H04W 4/02* (2013.01); *H04W 4/70* (2018.02); *H04W 64/00* (2013.01)

(58) Field of Classification Search
None
See application file for complete search history.

(56) References Cited

U.S. PATENT DOCUMENTS

| | | |
|---|---|---|
| 5,119,102 A | 6/1992 | Barnard |
| 2005/0032526 A1 | 2/2005 | Chen et al. |
| 2005/0162271 A1 | 7/2005 | Leitch |
| 2008/0242305 A1 | 10/2008 | Kahlert et al. |
| 2009/0005083 A1 | 1/2009 | Hoshino et al. |
| 2010/0177674 A1 | 7/2010 | Aggarwal |
| 2013/0095819 A1 | 4/2013 | Cheng et al. |
| 2014/0108149 A1 | 4/2014 | Jabara et al. |
| 2015/0185311 A1 | 7/2015 | Lohier |
| 2015/0237596 A1 | 8/2015 | Carlsson et al. |
| 2017/0064491 A1 | 3/2017 | Mirza et al. |

FOREIGN PATENT DOCUMENTS

| | | |
|---|---|---|
| KR | 20110065272 A | 6/2011 |
| KR | 101182525 B1 | 9/2012 |
| KR | 20130119376 A | 10/2013 |
| WO | 2017172125 A1 | 10/2017 |

OTHER PUBLICATIONS

International Search Report and Written Opinion for Application No. PCT/US2017/018984, dated Jun. 5, 2017, 11 pages.

*Primary Examiner* — Suhail Khan
(74) *Attorney, Agent, or Firm* — Alliance IP, LLC

(57) ABSTRACT

A wireless access device is provided that includes at least one processor, an antennae, and a localization engine. The localization engine is executable by the at least one processor to determine a location of the access device, receive a wireless signal from a particular device that includes presence information corresponding to the particular device that lacks self-localization functionality, and determine a location of the particular device based on the location of the access device and the presence information.

25 Claims, 8 Drawing Sheets

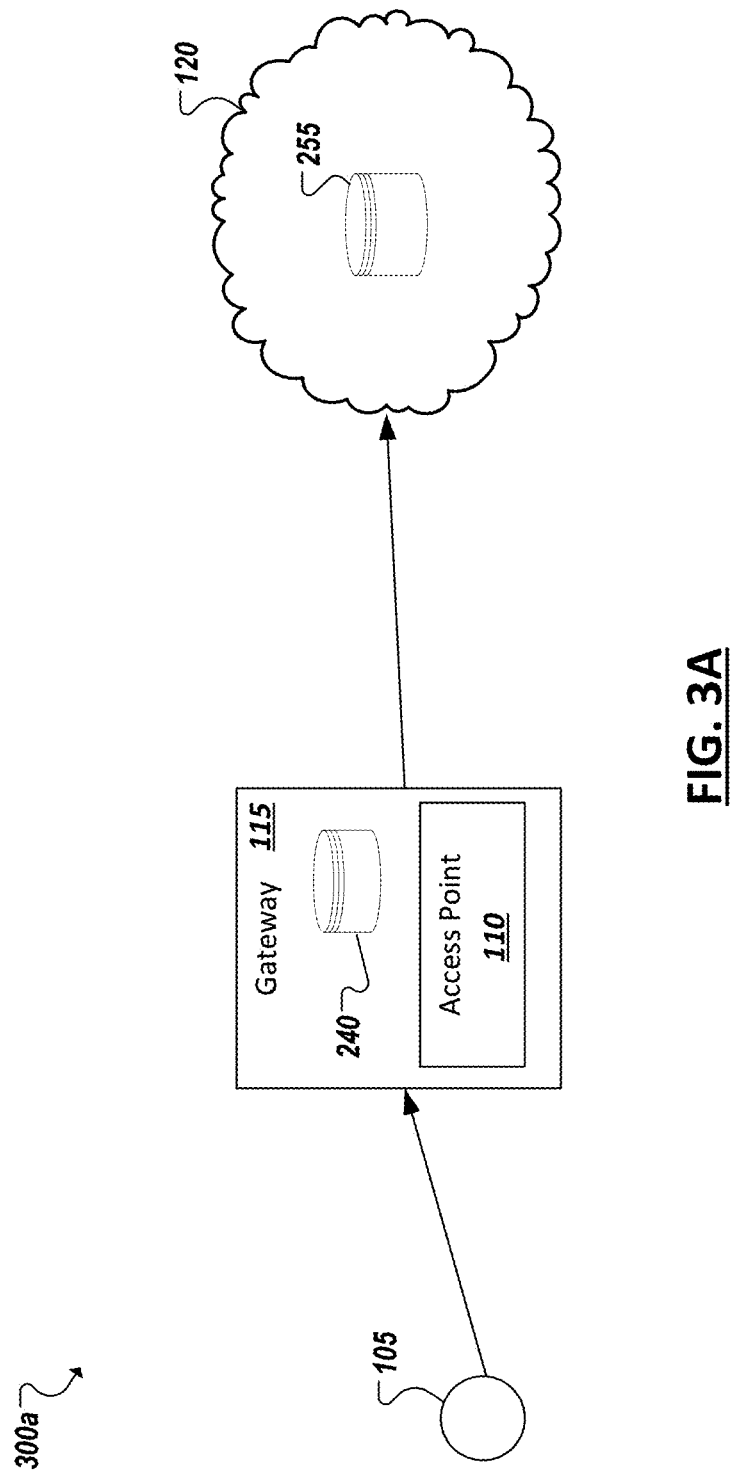

LOCALIZATION IN MACHINE-TO-MACHINE SYSTEMS

CROSS REFERENCE TO RELATED APPLICATIONS

This application is a continuation and claims priority under 35 U.S.C. § 120 of pending U.S. patent application Ser. No. 15/082,084, filed Mar. 28, 2016, entitled LOCALIZATION IN MACHINE-TO-MACHINE SYSTEMS, the entire disclosure of which is incorporated by reference herein for all purposes.

TECHNICAL FIELD

This disclosure relates in general to the field of computer systems and, more particularly, to device localization.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

FIGS. 3A-3B are a simplified block diagrams illustrating interactions of an example IoT system.

Like reference numbers and designations in the various drawings indicate like elements.

DETAILED DESCRIPTION OF EXAMPLE EMBODIMENTS

Figure 1:
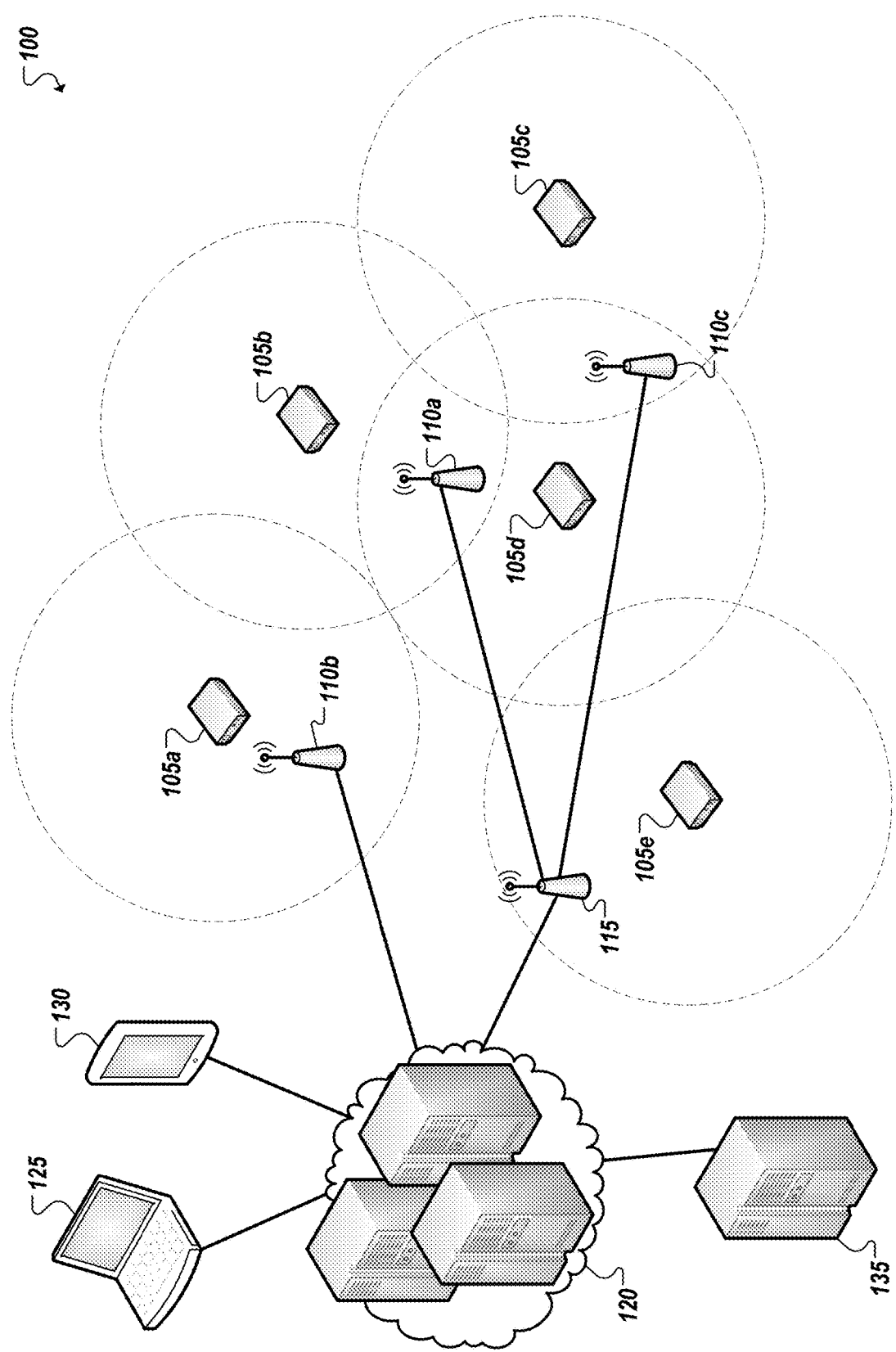
FIG. 1 illustrates an embodiment of an IoT system including multiple IoT devices.

Together with satellite global positioning systems, indoor location technology is a key contributor to delivering location-based services. Radio-based indoor positioning has been a popular approach, enabling robust indoor positioning in some systems. Global positioning systems (GPS) have also enjoyed wide-adoption in personal computing devices (e.g., smartphones, tablets, and in-vehicle computers), providing precise. Despite these advancements, localization within Internet of Things (IoT) systems can remain a challenge, particularly in systems deploying a heterogeneous mix of IoT devices. The capabilities of IoT devices can vary widely. Some devices may be provisioned with high speed processing capabilities, GPS modules, and sophisticated software stacks, while other devices are, by design, more simply provisioned (e.g., with lower power processors, minimal memory, specialized sensors, simplified communication interfaces, etc.). In this sense, some IoT devices can be considered resource-constrained in that their design is focused to include only those features and hardware that allow them to perform their particular function (e.g., as a particular sensor and/or actuator) and communicate with at least one other device to participate in machine-to-machine (M2M) IoT systems. Accordingly, such resource-constrained devices often do not possess higher-end localization capabilities, nor are they equipped with the infrastructure to support such capabilities (e.g., GPS) without weighing down the original design.

IoT systems are anticipated to connect billions of sensors, with the number and diversity of IoT devices and systems expected to continue to grow rapidly. For instance, IoT systems and applications are developing with domains and markets such as e-health, transportation, automotive, agriculture environments, energy management, monitoring, security and surveillance, shipping, among other known and future domains. Efforts at defining standardization measures for IoT networks have aimed to anticipate the difficulties presented by such diverse systems and devices, aiming to provide interoperability in connectivity, low-power communication, service discovery, IoT devices to Cloud communication and security.

Localization can be an important factor in IoT systems, enabling such features as asset tracking, reaching out to defective machines or objects, guiding drivers in smart parking, finding lost objects, guiding shoppers in commercial stores, etc. Two challenges for localization in IoT include allowing both indoor and outdoor localization and providing sufficient localization accuracy all while enabling such localization on a wide range of devices, from very tiny objects/sensors (e.g., with minimum power consumption for constrained battery-operated devices) to gateways and servers.

In some implementations, a localization solution can be provided for IoT devices and service consumers making use of the radio connectivity information, proximity to devices providing localization services, and virtual global-positioning through cloud-assisted localization. Such a solution can allow indoor and outdoor localization and is suitable for wide range of devices in IoT systems. Further, localization can be facilitated through such a solution both for fixed and mobile IoT sensors/devices and service consumers in indoor and/or outdoor environments.

Turning to FIG. 1, a simplified block diagram is shown illustrating an example system 100 including multiple IoT devices 105a-e positioned within an environment. The IOT devices 105a-e may be different instances of the same device or type of device, or may include devices of multiple different types and functionality. The environment may be an outdoor environment, such as a city space, roadway network, farm, ranch, park, amusement park, etc. In other cases, the environment in which the devices 105a-e are deployed may be an indoor facility, such as an office building, shopping mall, arena or stadium, performance venue, home, etc. In still other examples, the environment may include both indoor and outdoor spaces, such as school or university campus, amusement park, historical site, stadium, among other examples. The devices 105a-e may each have a respective sensor or actuator for generating or using corresponding types of data. Devices 105a-e may communicate data over wireless networks facilitated through IoT gateway devices 110a-c and/or wireless access points (e.g., 115). Wireless access points (e.g., 115) may provide access to external wide area networks (such as the Internet), and cloud-based or other external resources and systems (e.g., 120). IoT devices (e.g., 105e) may connect to such external resources 120 directly through a wireless access point 115. Other IoT devices (e.g., 105b-d) may connect to IoT gateways (e.g., 110a,c), which may, in turn, connect to a access point (e.g., 115) to access a wide area network or other external resources (e.g., 120, 135, etc.) hosting services capable of using data from the devices 105a-e, as well as localization information generated for the devices. In still other examples, an IoT device (e.g., 105a) may interface directly with an IoT gateway (e.g., 110b) that doubles as an access point to communicatively couple the IoT device to an external network, among other example configurations.

In some implementations, IoT devices (e.g., 105a-e) may be low-cost devices not equipped with local Global Positioning System (GPS) functionality, limiting the ability of these devices 105a-e to detect (and report) their own position. In one example, the wireless communication technology used by the IoT devices 105a-e may be a low-power, long range wireless radio technology, such as one based on an IEEE wireless standard, and each device can possess an interface configured to communicate with IoT gateways (e.g., 110a-c), wireless access points (e.g., 115), and even directly with other IoT devices in the IoT environment. The IoT devices can associate with access points for frame exchanges according to a defined wireless communication protocol (e.g., an IEEE protocol).

IoT gateways (e.g., 110a-c) can also be present in the IoT environment and can represent one or more points within the IoT system where traffic (from the devices 105a-e) is aggregated and stored. Gateways (e.g., 110a-c) can also possess data processing capabilities and host machine-executable logic to perform pre-processing of the raw IoT device data before it is communicated to one or more services (e.g., hosted by remote server systems (e.g., 120)). In some cases, access points and can be integrated with or collocated with gateways, among other examples.

In some implementations, IoT gateways (e.g., 110a-c) (and/or access points) within an IoT system can include functionality for determining locations of the devices 105a-e within its IoT system, based on information included in or obtainable from wireless signals of the devices 105a-e. Access points (e.g., 115) and/or IoT gateways (e.g., 110a-c) can also include functionality for making preliminary localization determinations based on their interactions with IoT devices 105a-e and can send their localization determinations to an aggregation point within or external to the IoT system, such as to a remote localization service (e.g., hosted at 120)) for further processing. In some examples, access points (e.g., 115) and/or gateways (e.g., 110a-c) can possess local GPS functionality, to allow them to determine their own location within the environment. An access point or gateway can then use its own location as a reference from which the access point or gateway can determine locations of IoT devices within the environment. Location information determined for the devices 105a-e can be stored (e.g., at an IoT gateway) and/or reported to remote localization services or other services (e.g., hosted in 120) for further processing and/or storage. Localization results can be thereby stored and dynamically updated (e.g., synced) in the cloud and account for IoT devices' positions and changes to position. For instance, one or more software applications may be provided that utilize location results determined for the set of IoT devices within the environment. In some cases, the IoT devices, themselves, may make use of location information determined on their behalf and can request positioning service, for instance, from IoT system gateways, leveraging the GPS functionality possessed by these other devices.

A system can further include user devices (e.g., 125, 130) to allow users to connect to servers over one or more networks and consume services (e.g., provided by one or more applications hosted at least partially in the cloud or locally on the user device) that are based on or otherwise utilize IoT device location information (e.g., as determined by localization functionality on access points (e.g., 115), gateways (e.g., 110a-c), and/or localization services (e.g., at 120) within the system 100. Such user devices (e.g., 125, 130) can include such examples as desktop computers, laptop computers, tablet computers, personal digital assistants, smartphones, feature phones, digital media players, media set top boxes, video game consoles, smart televisions, and so on. In one example, an IoT application consumer can themselves be localized (e.g., using GPS functionality of the user device 125, 130) for user in determining proximity of the user to various IoT devices (e.g., by a cloud-based IoT localization application). For instance, an IoT application can utilize user localization information to guide users to reach one or more of the IoT devices (or areas having the IoT devices), among other examples. Other systems (e.g., 135) may also interface with an IoT application to consume data generated by the IoT system, including data describing localization determinations made for the various IoT devices within the system. Such systems (e.g., 135) can themselves host programs and services which can further process data from the IoT devices to provide further functionality to consumer persons or systems, among other examples.

One or more networks can be provided to facilitate communication between IoT machine-to-machine networks (made of IoT devices (e.g., 105a-e), access points (e.g., 115), and gateways (e.g., 110a-c), and other systems and devices (e.g., 120, 125, 130, 135). Such networks can include local networks, public networks, wide area networks, broadband cellular networks, the Internet, and the like.

In general, "servers," "clients," "computing devices," "network elements," "hosts," "system-type system entities," "user devices," "sensor devices," and "systems" (e.g., 105a-d, 110a-c, 115, 120, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Some of the issues introduced above may be addressed by enhanced IoT systems, including enhanced access points, IoT gateways, and IoT services such as described herein. Such a solution can utilize multiple and modular mechanisms matching different localization/positioning scenarios in IoT environments: indoor and outdoor localization; localization of fixed and mobile IoT devices; localization of IoT service consumers; proximity-based guidance for IoT service consumers to reach or track the IoT devices (or areas having the IoT devices); low-cost and low-power localization solution on the IoT devices end; Cloud assisted localization without GPS need on IoT devices; and gateways assisted localization through localization service provision to IoT devices, among other features.

Figure 2:
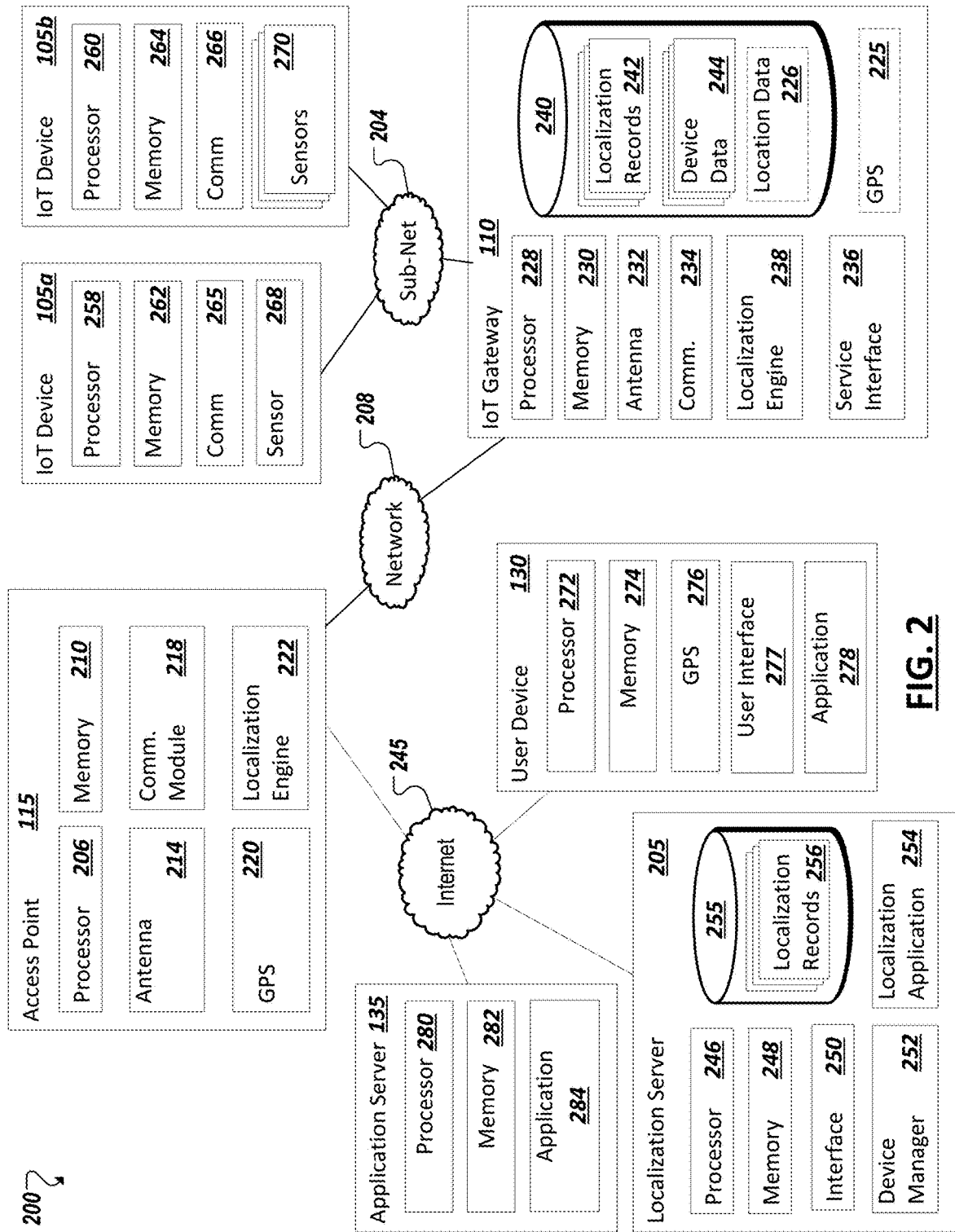
FIG. 2 illustrates an embodiment of a system providing localization of IoT devices.

FIG. 2 is a simplified block diagram 200 illustrating one example implementation of an IoT localization system, such as introduced above. In this example, a system can include one or more IoT devices (e.g., 105*a,b*), one or more IoT gateways (e.g., 110), and one or more wireless access points (e.g., 115), and localization server 205. IoT devices 105*a,b* can connect to an IoT gateway 110 (or even directly to wireless access points 115) using a machine-to-machine IoT network (or sub-network) 204. In this example, gateway 110 can further connect to a wireless access point 115 (e.g., over network 208) to further connect to a network 245 (such as the Internet) to communicate with localization server 205 in connection with the localization of IoT devices 105*a,b*.

Wireless access points (e.g., 115) within an IoT machine-to-machine network can be enhanced to assist in localizing IoT devices distributed within an environment. In one example, wireless access points (e.g., 115) can include one or more data processing devices (e.g., 206), one or more memory elements (e.g., 210), one or more antennae (e.g., 214), and one or more additional modules, implemented in hardware, firmware, and/or software, such as a communications module (e.g., 218), a localization engine (e.g., 222), a GPS module 225, among other potential modules (including modules representing combinations and divisions of the foregoing). Antennae 214 can enable the transmission and reception of wireless signals. A communication module 218 can be provided to modulate and demodulate signals, and enable communication with IoT devices (e.g., 105*a,b*), gateways (e.g., 110), and systems (e.g., 130, 135, 205, etc.) on wide area networks (e.g., 245)) according to one or more communications protocols and technologies. A communication module 218, in some cases, can enable a gateway 110 to communicate using any one of multiple different technologies to accommodate communication with multiple different types of IoT devices (e.g., 105*a,b*), including devices utilizing different wireless communications technologies.

Access points (e.g., 115) can be equipped with localization engines (e.g., 222), which can utilize location information identifying the location of the respective access point and derive a location of an IoT device (e.g., 105*a,b*) with which it (or an intermediate IoT gateway) communicates. In some implementations, location information of an access point (e.g., 110*a*) can be generated from GPS functionality 220 local to the access point 115 and configured to geolocate the access point. In other instances, location information can be embodied in location data (e.g., 226) which is programmed in memory of the gateway (e.g., 110) to identify the access point's location. For instance, GPS functionality of another device (e.g., a smartphone or other user device (e.g., 130)) can be utilized, when positioned near or at the gateway (e.g., 110), to determine geographic coordinates of the gateway. These coordinate, or other location information, can be written to the gateway (e.g., 110) as location data 226.

In either implementation, localization engine (e.g., 222) can access data describing the coordinates of the access point (e.g., 115) and determine a location for an IoT device (e.g., 105*a,b*) with which it communicates. A location determination for an IoT device can be made in response to a localization request of the IoT device (e.g., 105*a,b*). In other cases, a localization engine of an access point (e.g., 110*a,b*) can be made for a corresponding IoT device (e.g., 105*a,b*) each time a signal is received from the IoT device at the access point. The localization engine (e.g., 222, 224) can use the location of the receiving access point (e.g., 110*a,b*) as the starting point for the location determination, and further determine a location based on information included in the signal from the IoT device (e.g., a timestamp to determine time of flight of the received signal) and/or from characteristics of the signal itself (e.g., the angle of arrival of the signal, signal strength, etc.) detected at the access point, among other examples.

In some instances, a localization engine of an access point (e.g., 110*a,b*) can generate a preliminary location determination for an IoT device and cooperate with a gateway 115 and/or localization server 205 to report and/or improve the location determination. For instance, a localization engine (e.g., 222, 224) of an access point (e.g., 110*a,b*), in some implementations, can query a gateway for previously-determine location information or other information relating to a particular device (e.g., 105*a,b*). For instance, the localization engine (e.g., 222, 224) can obtain a record of a previously-determined location for a particular device and identify the time of flight measured for a signal previously received from the particular device at the access point (e.g., 110*a,b*) and compare the previously detected time of flight with a current time of flight detected for a signal from the particular device. If the time of flight is the same, the localization engine (e.g., 222, 224) can infer that the particular device is static and in the same position as last measured and the previously determined location for the particular device may be considered to also be the current location of the particular device. If the time of flight value is different, however, the localization engine (e.g., 222, 224) of the access point can generate a new, updated localization determination based on the most recently received signal from the particular device (e.g., 105*a,b*), among other examples.

In another example, multiple access points (e.g., 110*a,b*) may determine a location of a particular device and send these preliminary determinations to a gateway 115. In some instances, a localization engine of the gateway 115 can utilize multiple location inputs determined for a particular device by multiple different access points to derive a more precise location estimation for a particular device, among other examples. Further, location determinations made by localization engines (e.g., 222, 224) of access points (e.g., 110*a,b*) can be reported to the gateway 115, which can aggregate and store these determinations locally at the gateway 115 and/or forward these location determinations to a localization server 205, among other example implementations.

In some implementations, a gateway 115 can include one or more data processing devices (e.g., 228), one or more memory elements (e.g., 230), one or more antennae (e.g., 232), and one or more additional modules, implemented in hardware, firmware, and/or software, such as a communications module (e.g., 234), a service interface 236, a localization engine (e.g., 238), a GPS module (not shown), among other potential modules (including modules representing combinations and divisions of the foregoing). Antennae 232 can enable the transmission and reception of wireless signals from various access points (e.g., 110*a,b*) or directly from IoT devices (e.g., 105*a,b*). A communication module 234 can be provided to enable communication with various access points (e.g., 110*a,b*) and IoT devices (e.g., 105*a,b*), as well as a localization server 205 over a network 245 using service interface 236. A service interface 236 can also be provided to deliver non-location data (e.g., sensor data generated by sensors (e.g., 268, 270) of various IoT devices (e.g., 105*a,b*) and communicated to the gateway device 115) to other services making use of such data. In some cases, localization server 205 can consume both localization information and sensor data delivered to it by the gateway 115, among other examples. In some cases, an access point may include functionality of the IoT gateway, and vice versa.

The localization engine 238 of a gateway 115, may include functionality similar to that of the localization engines (e.g., 222, 238) of access points (e.g., 115) and/or gateways (e.g., 110) of the IoT system. For instance, in some implementations, a gateway 110 may communicate directly with various IoT devices (e.g., 105*a,b*) in the system and may likewise determine the location of a particular IoT device based on a determination of the gateway's own location (e.g., using local GPS functionality 225) as well as the content and measured characteristics of the signal(s) from the particular IoT device. The localization engine 238 can store and have access to localization data 242 describing previously detected location determinations for one or more IoT devices in the IoT gateway's subnet 204. In some cases, localization data 242 may also explicitly identify the content and signal characteristics identified for a corresponding IoT device (e.g., 105*a,b*) from which a corresponding location decision was based. The localization engine 238 can maintain localization records (e.g., 242) identifying the respective location determinations for each of the various IoT devices (e.g., 105*a,b*) within its subnet or the IoT system as a whole. For instance, localization records 242 can identify the most-recently determined location of a particular IoT device, as well as historical location determinations of the particular IoT device, characteristics of signals used to determine these locations, among other information.

In some implementations, a localization engine (e.g., 222) can further process information in the localization records to make additional determinations. For instance, two different locations may be determined for a particular IoT device at the same or different time by the same or different IoT gateways or access points, and a localization engine (e.g., 222) can possess logic to determine a more precise location estimate for the particular IoT device based on this information. In some cases, the localization engine (e.g., 222, 238) can additionally identify and infer whether a particular IoT device is a mobile or static IoT device based on determining whether changes in localization determinations are reported over time by the particular IoT device. Indeed, device data 244 can be maintained in one or more databases or data stores (e.g., 240), for instance, at an IoT gateway 110, to describe the various IoT devices (e.g., 105*a,b*) (and potentially also access points (e.g., 115)) within the IoT system or IoT subnet. Device records can be maintained for each device and identify an identifier (e.g., MAC address, SSID, etc.) of the IoT device, whether the IoT device is static or mobile, the make and model of the device, signal strength characteristics of the device, last determined location for the device within the environment, whether the device possesses native geolocation or GPS functionality, among other characteristics that can be considered and used in connection with localization of IoT devices within the system either by the gateway 110 or access points 115 (or both).

IoT devices (e.g., 105*a,b*) can themselves include processing apparatus (e.g., 258, 260), memory (e.g., 262, 264), and communications modules (e.g., 265, 266) enabling communication with one or more IoT gateways and/or access points. In some implementations, communications modules (e.g., 265, 266) may also enable device-to-device communication (e.g., between device 105*a* and device 105*b*). An IoT device may further include one or more sensors (e.g., 268, 270) to measure attributes of its environment and generate sensor data, which may be used within the IoT system or an external application or service (e.g., hosted at server 135, 205, etc.) to generate outcomes based on the sensor data, or a combination of sensor data from the various IoT devices within the system. Some IoT devices may instead, or additionally, include one or more actuators to consume data generated by another IoT device or a service (e.g., 254, 284) utilizing IoT sensor data and/or IoT localization data to perform a particular action or event. Device data 244, in some instances, can indicate the types of sensors or actuators present on each device (e.g., 105*a,b*) as well as the types of data that may be generated or consumed using each device, among other example information.

A gateway device 110 can interface with a localization server 205 (e.g., using service interface 236) (e.g., using an access point 115) to report the determined locations of IoT devices with an environment. In one example, a localization server 205 can include one or more data processing devices (e.g., 246), one or more memory elements (e.g., 248), and one or more additional modules, implemented in hardware, firmware, and/or software, such as interface 250, device manager 252, and localization application 254, among other potential modules (including modules representing combinations and divisions of the foregoing). The interface 250 can include the implementation of an application programming interface (API) and can enable communication between the localization server (e.g., localization application 254) and one or more gateways (e.g., 110) and/or access points (e.g., 115), as well as one or more client systems (e.g., 130, 135) consuming localization record data 256 and localization services (e.g., provided through localization application 254). A device manager 252 can manage device location information for IoT devices in one or more IoT systems or networks. Localization records 256 can be maintained to include information similar to those in localization records 242 and/or device data 244, to at least indicate, for each IoT device managed by the localization server 205, the last determined location of the device. Localization records may index the location information by device identifier (ID). As noted, additional information may also be provided in localization records, including the type, make, and model of the device, whether deployment of the device is mobile or fixed in nature, time of the last determined location of the device, among other information. In some cases, localization data 256 or other data maintained in localization server database 255 may also aggregate sensor data or other non-localization data generated from the IoT devices and related to the core functionality of the IoT devices. Further, localization of the IoT devices can be used to enhance the non-localization data by providing geographic or location-specific context for readings, events, or other information embodied in sensor data and other non-localization data generated from the IoT devices (e.g., 105a,b), among other examples.

Further, localization application 254 can assist a gateway (e.g., 110) or access point (e.g., 115) in making localization determinations for IoT devices in its respective IoT network. As an example, a gateway (e.g., 110) or access point (e.g., 115) may query the localization application 254 for a last known location or other information concerning a particular IoT device for which location is being determined. In still other cases, a gateway (e.g., 110) or access point (e.g., 115) may send preliminary localization determinations and information collected from IoT devices and IoT device signals to be further processed by the localization application to derive a "final" location determination of the IoT device, among other examples.

A localization application 254 may interface with one or more user devices (e.g., 130) to assist user devices in accessing or managing various IoT devices (e.g., 105a,b) based on their respective locations. In one example, a user device 130 may include one or more processors (e.g., 272), one or more memory elements (e.g., 274), communications functionality (not shown), an operating system (not shown), and programs to operate in connection with the operating system, such as, in this case, a GPS module 276 and one or more applications (e.g., 278). User devices may also provide a user interface, such as a graphical display device and one or more input devices, such as a keyboard, trackpad, mouse, or touchscreen, among other examples. One or more applications (e.g., 278) may provide functionality for managing, interacting with, or consuming data relating to an IoT system including IoT devices (e.g., 105a,b), access points (e.g., 115), and gateway 110. In one example, the application 278, may facilitate interoperation with a localization application 254 or other application (e.g., 284) hosted on a cloud-based resource. In some cases, location information for the user device 130 (determined using GPS module 276) can also be utilized, for instance, by localization application 254, in providing localization or other services for consumption at the user device 130. As an example, location of a mobile user device (e.g., 130) may be determined and communicated to the localization application 254. The localization application 254, aware of the locations of each of the IoT devices (e.g., 105a,b) within a given IoT system, can coordinate directions to a particular IoT device or region of an environment including the IoT system, identify a nearest IoT device, region, or measured environment attributes, or provide other results that are based on the location of the user device, among other examples.

In some cases, another application (e.g., 284) can be provided which makes use of localization information provided by localization server to provide one or more services (e.g., to a user device 130 through application 278). For instance, application 284, rather than specifically concerned with IoT device localization or localization generally, may have as its core functionality other functionality that nonetheless can make use of location information. As an example, the application 284 may provide weather forecasting, traffic forecasting, travel, safety, or security services, among other examples, using localization information concerning the IoT system in connection with information collected from sensors (e.g., 268, 270) of the IoT devices (e.g., temperature, humidity, accelerometer, light measurements, noise measurements, gyroscopic, liquid detection, radiation measurements, chemical detection or measurements, movement detection, or other information collected by the sensors and embodied in sensor data generated by the IoT devices. In one example, an application server (e.g., 135) can itself include one or more data processing devices (e.g., 280) and memory (e.g., 282), for instance, storing instruction executable to implement application 284. In still other examples, servers 135 and 205 can be combined, such that localization services (e.g., 254) and other IoT-related applications (e.g., 284) are hosted on the same system, among other potential implementations.

While the examples of FIGS. 1-2 (and other examples) herein may describe various elements (e.g., IoT devices 105a-b, IoT gateways 110, and access point 115) as unitary devices including a set of functionality in a single device or package, in other instances, such elements can be embodied in multiple distinct devices. For instance, massively connected network principles can be employed from which distinct devices can be interconnected (e.g., wirelessly within an IoT network) to logically implement a single element having and being capable of implementing at least a portion of the combined features of the interconnected devices. Indeed, massively connected IoT network principles, such as described and contemplated within the Open Interconnect Consortium (OIC) or other standards or platforms, can be utilized in connection with the systems and device implementations described in the present disclosure, for instance, to allow opportunities to form ad hoc networks of multiple devices (e.g., 105a-c, 110, 115, etc.) to be automatically (and even autonomously) identified and launched to enhance or supplement the functionality of any one or a combination of the multiple devices capable of communicating within a machine-to-machine network, among other example features.

Turning to FIG. 3A, a simplified block diagram 300a is shown, illustrating a portion of one example IoT system. In some implementations, as introduced above, functionality of an access point 115 and a gateway 110 can be collocated. A gateway 110, in some instances, can maintain a database 240 of localization information for the collective IoT devices (e.g., 105) within a system. In such instances, the gateway 110 can receive signals directly from one or more IoT devices within an environment and can identify the device 105 (e.g., from a device identifier encoded in the received signal) and detect one or more characteristics of the signal (e.g., time of flight, signal strength, angle of arrival, etc.). Before re-calculating the location of the device, the gateway 110 can consult database 240 to determine whether a location has already been determined for the device and whether this previous location determination is still valid for the device based on the detected characteristics of this most recently received signal (e.g., by comparing characteristics (e.g., time of flight, signal strength, angle of arrival) of a previously received signal with the characteristics of the most recent signal). If the location stored in the database 240 is determined to be out-of-date, however, the gateway 110 can apply local localization logic to determine an updated location of the IoT device 105 based on a determination location of the gateway 110 (e.g., from a local GPS module) together with the detected signal characteristic measures. The gateway 110 can inform a localization system 205 of a location determination (or even that a previous location determination for a device (e.g., 105) remains current), so as to ensure localization data maintained at the localization system 205 (e.g., in data store 255) is also up-to-date.

Figure 3B:
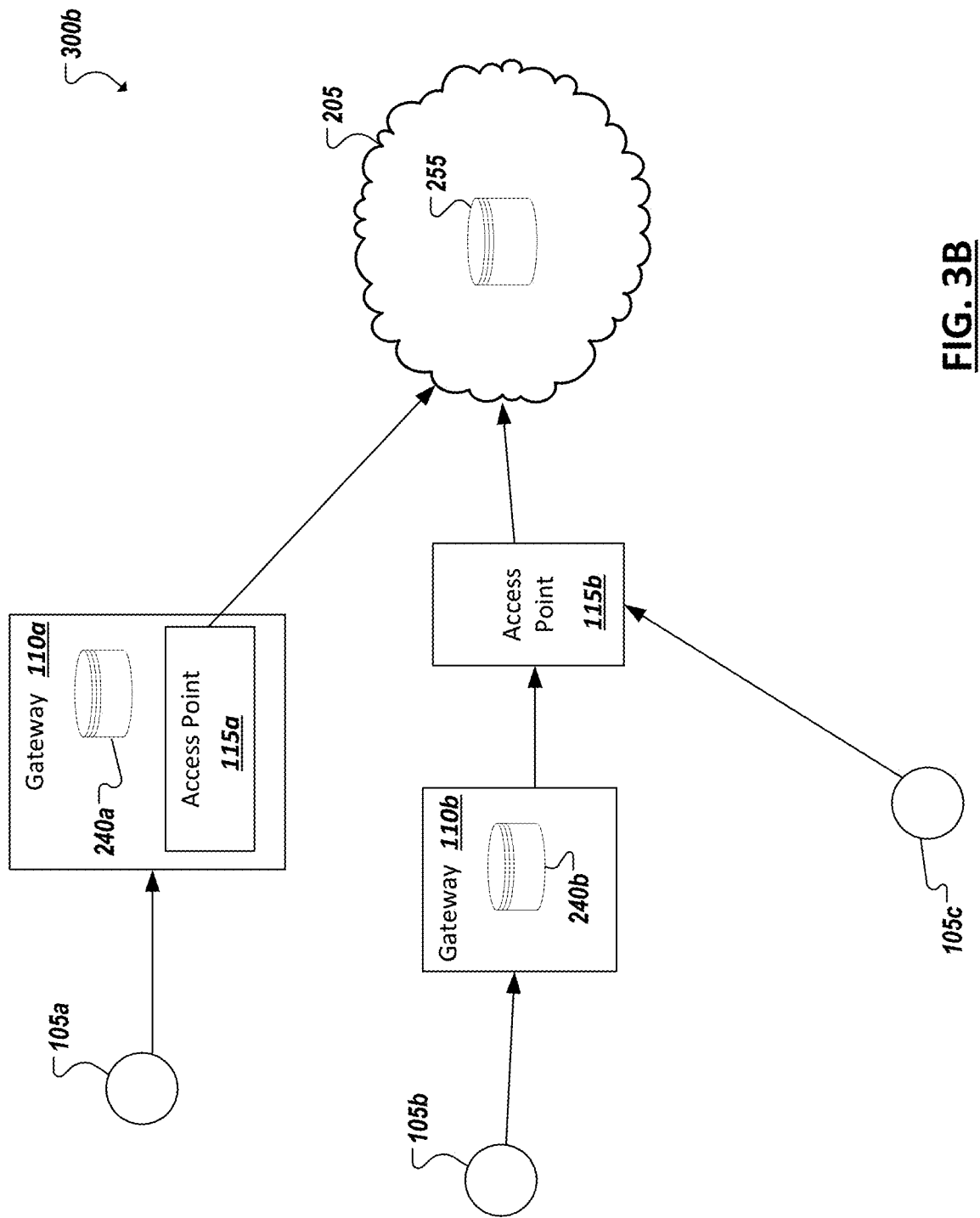

Turning to FIG. 3B, IoT device location can be determined within an IoT system using one or more of a variety of mechanisms. For instance, as in the example of FIG. 3A, an IoT device (e.g., 105c) may send signals and communicate directly with an access point (e.g., 115b), which possesses localization logic to determine the device's location and communicate this location information to localization system 205. In some instances, an access point (e.g., 115b) may not store records of previously-determined locations of IoT devices (e.g., 105a-c) within a system, but nonetheless possess localization logic to detect characteristics of the IoT device's 105c signal and determine its own location (e.g., from a GPS module at the access point 115b or predetermined location data storing the access point's 115b location in memory of the access point 115b), further using this information to determine a location prediction for the IoT device 105c. In connection with this determination, the access point 110a may communicate with an IoT gateway (e.g., 110b) or with a remote localization system 205 to access information from previous localization determinations (e.g., stored in 240b, 255), for instance, to determine whether the IoT device (e.g., 105c) has moved (or is movable) and whether a new location determination should be made based on the most recently received signal. For instance, the access point 110c may query localization records 255 of the localization system 205 to determine information concerning the IoT device, including whether a previously determined location is stored within the records 255, and characteristics of previously-detected signals that served as the basis for this previously determined location, among other information.

In some cases, localization logic of an access point or a localization system may "finalize" a location determination made, in part, by an IoT gateway. For instance, multiple IoT gateways may receive a given signal from a particular IoT device and derive a final location determination for the particular IoT device based on the preliminary location determinations and signal characteristics reported by the multiple IoT gateways. For instance, localization logic of the access point or the localization system may triangulate or otherwise determine the device's location based on a comparison or synthesis of the various signal strengths, times of flight, and respective angles of arrival reported for the same signal by the multiple different access points, further considering the respective locations of the access points (also reported to or stored at the gateway, access point, or localization system). In other instances, a "final" location of a device (e.g., 105a, 105b) can be determined solely by the localization logic of an IoT gateway (e.g., 110a, 110b) receiving a signal from the device (e.g., 105a, 105b). In some instances, such determinations can cause the gateway (e.g., 110a, 110b) to, in turn, update its database (e.g., 240a, 240b) and/or communicate this localization information for the device (e.g., 105a, 105b) further to a localization system 205 (e.g., to update localization records of data store 255).

In some instances, a IoT gateway can be an intermediary between an IoT device (e.g., 105b) and an access point (e.g., 115), with the access point providing access to other network resources, such as localization system 205. In other cases, functionality of an access point (e.g., 115a) can be integrated with an IoT gateway (e.g., 110a) (such as in the example of FIG. 3A), allowing an IoT device 105a to effectively communicate directly with a device interfacing with external resources (e.g., 205), among other examples. In instances where an IoT device (e.g., 105c) is out of range of a gateway, its typical gateway is of service, or in implementations of an IoT system omitting the inclusion of a gateway, an IoT device (e.g., 105c) may instead interface directly with an access point (e.g., 115b), such as introduced above, among other examples. An IoT system may utilize various collections of IoT gateways, including combinations where some or all of the IoT gateways possess local localization records and access point functionality (as with gateway 110a integrated or collocated with access point 115a in FIG. 3B) or communicate through a separate access point (e.g., 115b), among other examples.

Figure 4:
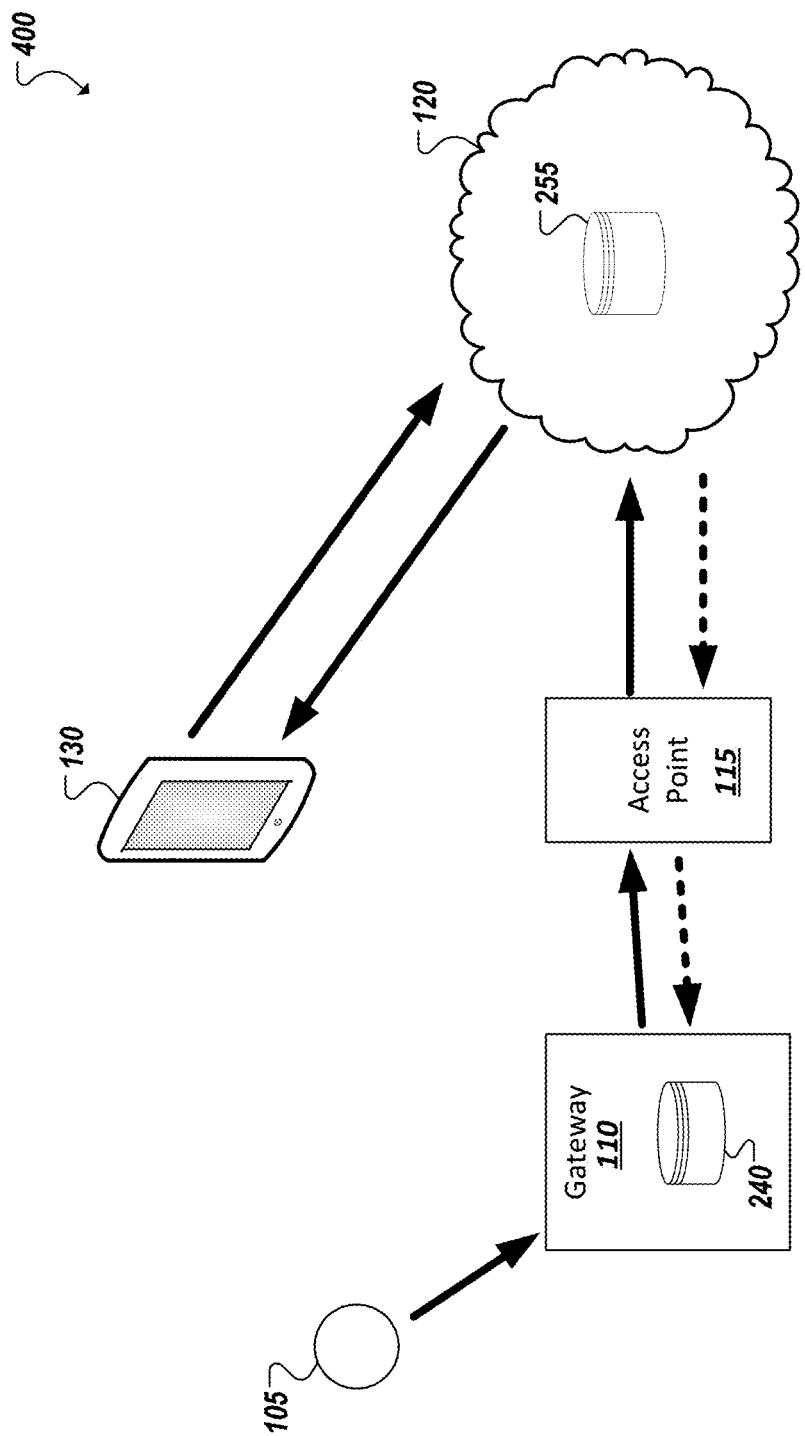
FIG. 4 illustrates a simplified block diagram illustrating localization of an example IoT device within an IoT system.

Turning to FIG. 4, a simplified block diagram 400 is shown illustrating localization of a particular IoT device 105 within an IoT system including an IoT gateway 110, access point 115, and localization system 205. IoT devices' locations may be fixed or static, in that the location never or rarely changes or otherwise remains static for extended periods of time, or mobile (where the IoT's device is constantly or frequently changing). In the example of a fixed or static IoT device, the fixed IoT device (e.g., 105) periodically reports its presence to an IoT gateway (e.g., 110) in its subnet. The presence information can be embodied in a signal that includes the ID for the IoT device 105, a time stamp (for use in ultimately determining the "freshness" of the device's location), among other information. In some cases, the signal can include sensor data generated by the IoT device (e.g., reporting temperature, water leakage, pollution level, mechanical defect, etc.). Other characteristics can be detected from the signal, including signal strength, angle of arrival (i.e., with respect to the receiving IoT gateway 110 or access point 115), and refresh rate (i.e., frequency of uplink data transmission), among other examples.

A gateway 110 may include a database 240 that stores the ID of each IoT device in its subnet. The construction of the database may be determined during IoT network deployment or integration of the gateway within the subnet. Further, initial locations of some or all of these IoT devices can be determined and also recorded in the database 240. When the IoT gateway 110 receives the presence information from the IoT device 105 (or receives a location determination made for the device by the access point 115 or localization system 205), the gateway 110 can map the received ID of the IoT device to the one in its database 240 and add the location information to the record corresponding to the IoT device. In some cases, location determinations received or made by a gateway may be then communicated to the localization system 205 to update global localization data in data store 255. Localization records can include the ID of the device, IoT device status, IoT device sensor information, time stamp corresponding to the location determination, location of the IoT device, signal characteristics upon which the location was based, an ID of the access point (or gateway) which determined the location, among other information.

An gateway 110 (or access point 115) can determine the location of an IoT device from presence information included in or detectable from the signal sent to the gateway 110 by the IoT device 105. For instance, an IoT gateway 110 may dynamically derive the location of the IoT device 105 by reference to the gateway's 110 own location and the angle of arrival of the signal, and measuring the time of flight of the signal from IoT device 105 to the gateway 110. In one example, time of flight can be measured by the gateway 110 by determining the different between the time stamp encoded in the signal and the time of the signal's reception at the access point. IoT gateways, access points, and IoT systems may be configured to determine localization of IoT devices with varying degrees of precision. In some cases, a range of coordinates can be associated with a particular access point and a location determination can indicate that an IoT device resides within this range. For instance, the range may be based on the signal range of access point and/or IoT device. In other cases, a more precise (or smaller range of coordinates) can be determined, using the general signaling range of the gateway and/or IoT device as a starting point. Using information such as signal strength, angle of access, direction and speed of a moving IoT device (from which the signal was received), and time of flight (among other measures), a more precise determination of IoT device location can be made.

In some instances, an access point (or a gateway) can store a minimal amount of information corresponding to previously detected IoT devices and their locations. For example, previous time of flight information can be stored at the access point (e.g., 115) corresponding to each of the IoT devices 105 for which location has been previously determined. The access point can then compare the time of flight of new signals from the same device 105 with the previously determined time of flight for the device. If the time of flight is the same or within an accepted margin of error, the access point can determine that the location of the device 105 has not changed and will not re-determine the location of the device 105. However, if the new time of flight measure differs beyond an acceptable threshold from the previous time of flight measure for the same device 105, the access point can then re-determine the location to identify the updated location of the device 105 and report this new location to the localization system 205. As noted above, in cases where such information is not stored at the access point locally, the access point can similarly determine whether a change in location has occurred by querying records of the gateway 110 or localization system 120 to determine whether the time of flight (or another measure of the signal's characteristics) have changed for a device 105 since the last time location was determined for the device 105.

For mobile IoT devices, each time a signal embodying presence information is received at an IoT gateway 110 from the IoT device (e.g., 105), location of the device 105 can be re-determined. As with static devices, location can be determined based on the location of the detecting gateway together with other information from the signal. In some cases, a device may be predesignated as "mobile" rather than "static" or "fixed", causing localization processing of the device to be handled accordingly. For instance, while localization processing for static devices can be conditional (e.g., based on a preliminary determination that location may have changed), localization determinations can be made continuously and unconditionally for mobile devices (e.g., every time a signal (or nth signal) is received from the device). Localization determinations for mobile devices may nonetheless use and call upon data describing previously determined location for a given device (e.g., as stored at 240 and/or 255). For instance, location determinations can be made by identifying changes between current signal characteristics (e.g., time of flight, signal strength, or angle of access) and previously detected signal characteristics to derive an amount and direction of location change from the previously determined location. In some cases, a history of location determinations for each device may be determined to detect whether a device tends to move or stay in the same location. Based on this analysis (e.g., by localization system 205), the device can be designated as mobile or static and managed accordingly.

In some implementations, users can utilize services based on localization of IoT devices 105 within an environment through corresponding user computing devices (e.g., 130). User devices (and corresponding use cases) may be statically location. For instance, a user may access localization data or services based on the localization data from a desktop computer or a substantially stationary mobile computing device remote from the environment in which the IoT environment is deployed. In such static use cases, the user device 130 may simply make requests of the localization system 205 (or another service making use of localization information from localization system) and receive data and services in return. In other instances, an IoT service consumer (e.g., a user using an IoT application on their handheld device or personal computer) can be localized for proximity to one or more IoT devices 105 for which the localization system 205 tracks location. Indeed, in some cases, the user device 130 can be mobile, with the location of the device likewise changing (in relation to IoT devices in the environment). The user device 130 can possess native GPS functionality and can share the location or location changes of the user device's 130 with the localization system 205, to allow the localization system 205 to determine proximity between the user device and one or more of the IoT devices (e.g., 105) in the system and even directions to the IoT device from the user device's location. In other instances, proximity and directions can be determined at the user device 130, for instance, by receiving coordinates to a given IoT device from localization system 205 and deriving, at the user device (e.g., using an application executed on the user device), a path or distance to a given IoT device. Accordingly, services can be provided based on both the determined IoT devices' locations and the user device's location to guide a user to particular IoT device or the area of the IoT device within an environment. In cases where both the IoT device 105 and the user device 130 are mobile, determining a distance and/or path between the IoT device 105 and the user device 130 can be determined at the user device or localization system iteratively, as each change in location of IoT device 105 and user device 130 are determined and communicated.

In cases where the localization system 205 drives localization of IoT devices with respect to a moving user device 130, the user device 130 can self-localize using its local GPS and continuously send user device localization information to the localization system 205 (or at least send such information as changes in user device location are detected at the user device 130). The localization system 205 can participate in localization of one or more subject IoT devices 105 and continuously compare the location of the IoT service consumer (e.g., 130) with that of the IoT device 105 (or IoT device area) to generate proximity localization information describing the distance and directionality of the user device 130 with respect to the IoT device 105. The localization system 205 can push this proximity localization information to the user device as it is generated, along with, in some cases, guidance information describing a path between the user device 130 and IoT device 105. In other instances, guidance information and proximity localization information can be generated at the user device 130 based on IoT device location information pushed by the localization system 205 to the user device 130 as it is determined within the IoT system (e.g., by access point(s) 115 and/or gateway 110). In either instance, user device 130 can render data representing IoT device locations and/or directions on a display device of the user device 130 based on the data received from the localization system 205.

A variety of use cases and application may make use of the location of IoT devices within an environment. IoT device location may enhance and add context to sensor data generated by IoT devices. Other examples may include assisting IoT service consumers with localization of IoT devices (or IoT devices areas), such as to assist a person looking for their car (e.g., equipped with an IoT sensor) or an empty spot in a smart parking lot (e.g., including gateways and/or car detection sensors). In other examples, localization services can be provided to assist a farmer (using a mobile user device) in finding a defective sprinkler in a farm, a (mobile) shopper in a retail store looking for a specific item, a (static) fleet manager managing the location of multiple vehicles (with sensor devices) in a fleet, a factory engineer looking for defective machines and/or trying to reach defective machines in a factory, a (static) environmental serviceperson tracking pollution within a city, a (mobile) driver tracking snow/ice conditions of roads in an area, a (mobile) tourist looking for restaurants having empty tables (fixed of mobile IoT service consumer), and a (mobile) tourist interested in audio visual information about an approaching artifact, landmark, or point of interest, among many other potential examples and use cases.

Figures 5A, 5B:
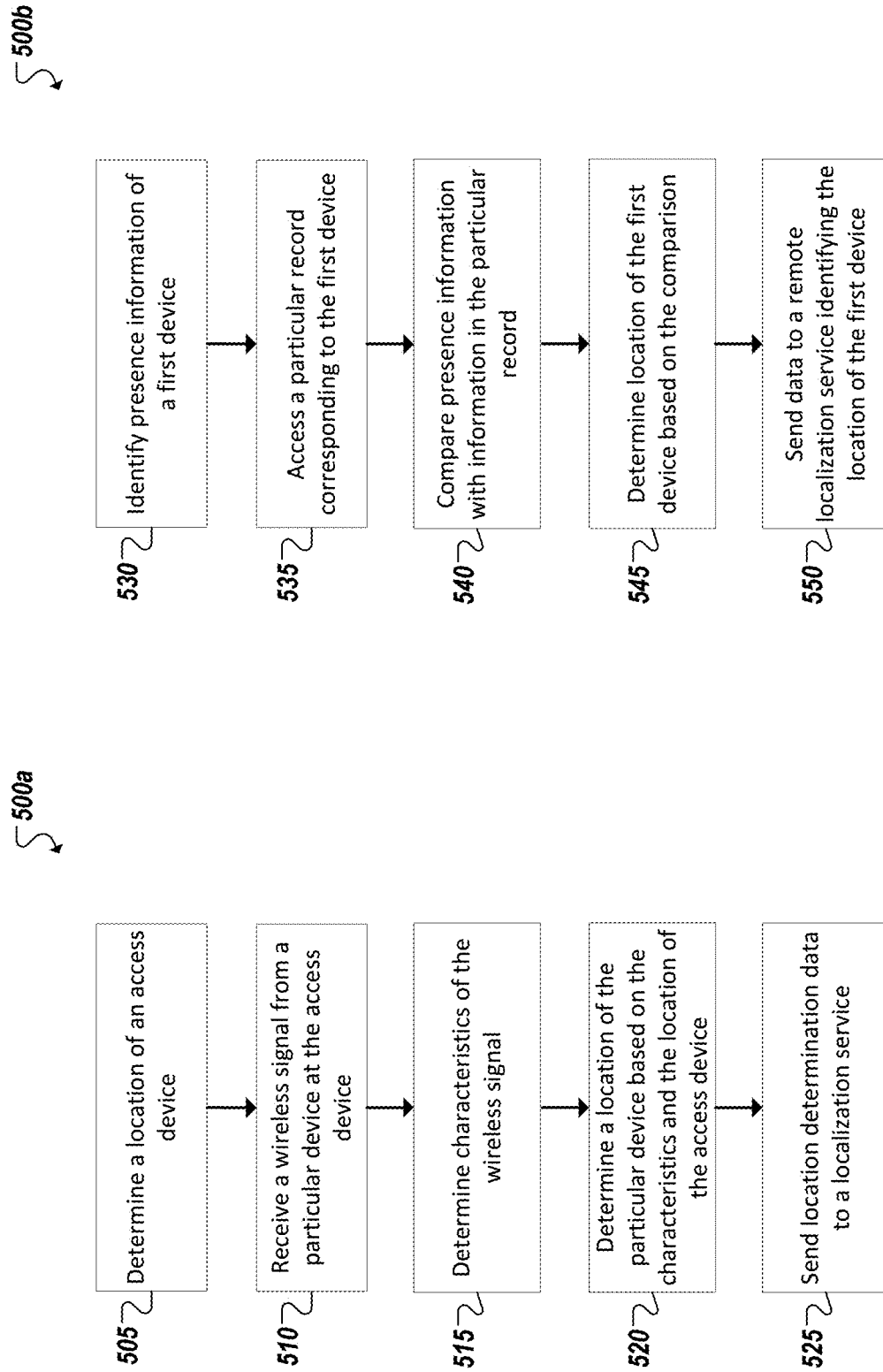
FIGS. 5A-5B are flowcharts illustrating example techniques for localizing IoT devices within an environment.

FIGS. 5A-5B are flowcharts 500a-b illustrating example techniques for localizing IoT devices within an environment. For instance, in the example of FIG. 5A, a location of an access device (such as an IoT gateway device or wireless access point) can be determined 505 (e.g., using a local GPS module or locally-stored location data) that connects wirelessly to one or more IoT devices to provide broader network connectivity to the IoT devices. A wireless signal can be received 510 at the access device from a particular one of the IoT devices. The access device can determine 515 characteristics of the wireless signal, such as its angle of arrival, time of flight, signal strength, and time stamp, among other examples. The access device can determine a location of the particular IoT device based on the characteristics and the location of the access device. The access device can send location determination data, identifying the determined location of the particular IoT device, to a localization service. In some cases, the location determination data can be sent directly to the localization service from the access device. In other instances, the access device sends the location determination data to the localization service (e.g., directly or via another access device (e.g., a wireless access point)). Localization records stored at either or both of the access device and localization service can be updated to reflect the determined location of the IoT device.

In the example of FIG. 5B, a gateway can receive or otherwise identify 530 presence information of a first device, either directly from the first device or as reported by another access device receiving a signal from the first device. Localization records can be stored at the gateway or a localization service, and the gateway can access 535 the localization record corresponding to the first device. The localization record can identify a previously determined location for the first device based on a signal previously sent by the first device (e.g., to the gateway directly). The presence information can be compared 540 with information in the localization record, for instance, characteristics of the previous signal from the particular device can be compared 540 with characteristics of the current signal from the particular device. Further, a location of the device can be determined 545 based on the comparison. For instance, the comparison can indicate that the characteristics are substantially the same, resulting in a determination that the location of the particular device has not changed. Alternatively, the comparison can indicate differences between the two signals' respective characteristics, suggesting that the particular IoT device has changed its location relative to the receiving gateway (or wireless access point). The location of the device receiving the signal (e.g., the location of a gateway or wireless access point) can be identified and also used to determine 545 the location of the particular device. Data can be sent 550 to a remote localization service identifying the determined location of the particular device. A determination that the device's location has changed can prompt a database maintained at the gateway and/or localization server to be updated to reflect the new location (as well as at least a portion of the presence information. In some cases, presence information can be embodied in signals sent from the particular IoT device.

Figure 6:
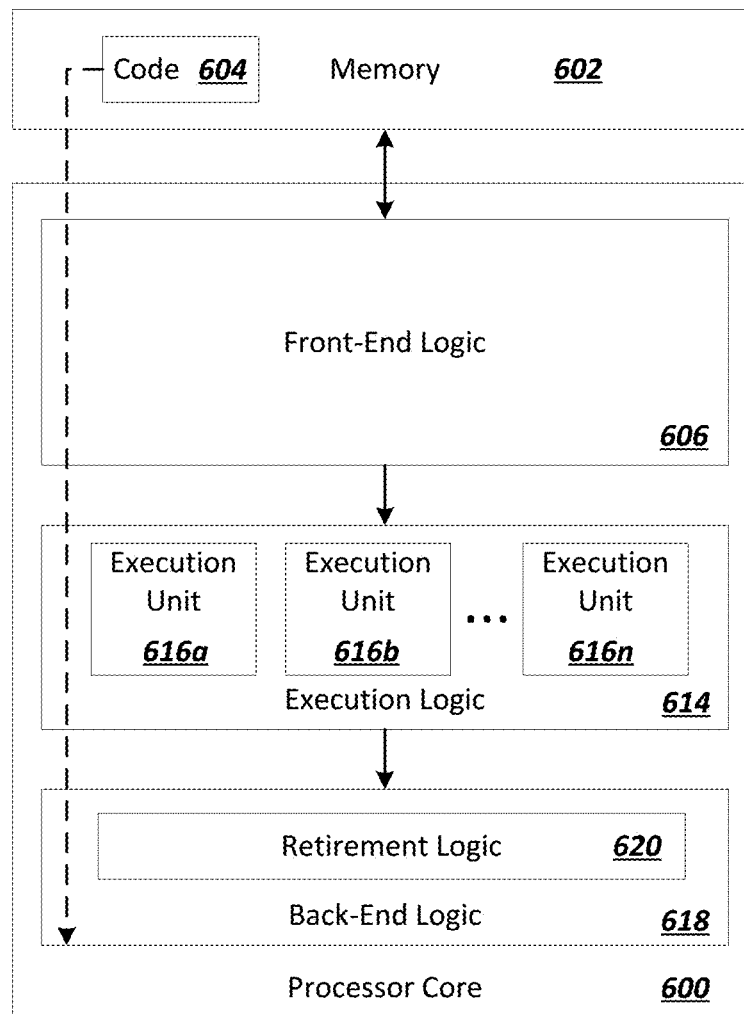
FIG. 6 is a block diagram of an exemplary processor in accordance with one embodiment.
Figure 7:
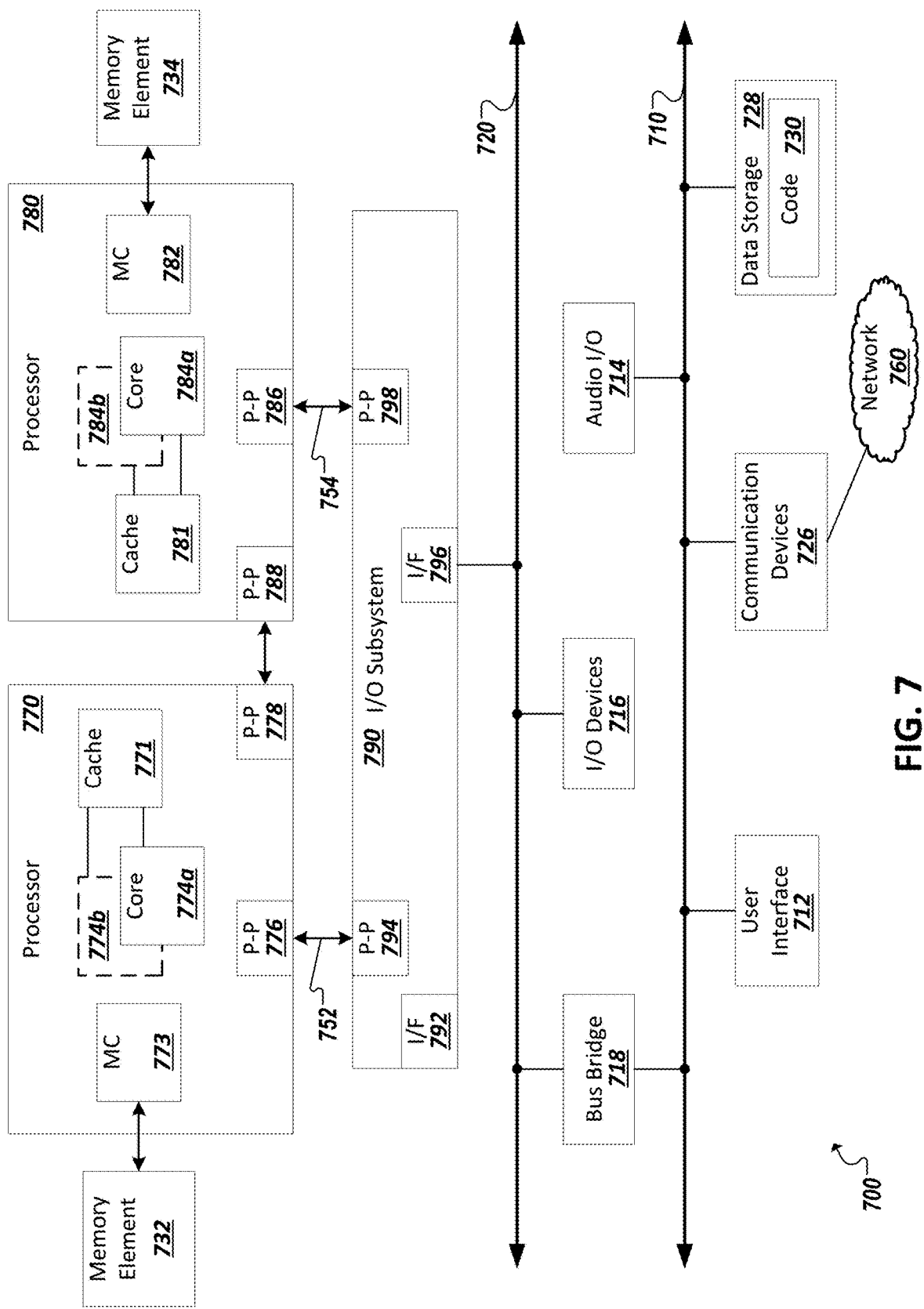
FIG. 7 is a block diagram of an exemplary computing system in accordance with one embodiment.

FIGS. 6-7 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 6-7.

FIG. 6 is an example illustration of a processor according to an embodiment. Processor 600 is an example of a type of hardware device that can be used in connection with the implementations above. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the computing systems described herein may be configured in the same or similar manner as computing system 700.

Processors 770 and 780 may also each include integrated memory controller logic (MC) 772 and 782 to communicate with memory elements 732 and 734. In alternative embodiments, memory controller logic 772 and 782 may be discreet logic separate from processors 770 and 780. Memory elements 732 and/or 734 may store various data to be used by processors 770 and 780 in achieving operations and functionality outlined herein.

Processors 770 and 780 may be any type of processor, such as those discussed in connection with other figures. Processors 770 and 780 may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a user interface 712 (such as a keyboard, mouse, touchscreen, or other input devices), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium, and an apparatus including at least one processor, an antennae, and a localization engine. The localization engine may be executable by the at least one processor to determine a location of the apparatus, receive a wireless signal from a particular device that includes presence information corresponding to the particular device that lacks self-localization functionality, and determine a location of the particular device based on the location of the apparatus and the presence information.

In one example, the presence information comprises an identifier of the particular device and a time stamp.

In one example, the wireless signal further comprises sensor data generated by one or more sensors of the particular device.

In one example, the localization engine further detects one or more characteristics of the wireless signal and determining the approximate location is further based on the one or more characteristics.

In one example, the one or more characteristics comprise one or more of time of travel, signal strength, and angle of arrival of the wireless signal.

In one example, the apparatus receives signals from a plurality of devices including the particular device and the localization engine determines a respective location for each of the plurality of devices based on the corresponding signals and the location of the apparatus.

In one example, a wireless signal is sent by the wireless access point to communicate the location of the particular device to a gateway device.

In one example, the apparatus includes the gateway device that maintains a database of locations for a plurality of devices within a subnet of the gateway device.

In one example, the gateway device is one of a plurality of gateway devices in communication with a wireless access point.

In one example, the localization engine is further to detect a characteristic of the wireless signal, access a record in a data store corresponding to the particular device, wherein the record identifies information describing a previously received signal from the particular device and a characteristic of the previously received signal, and compare the characteristic of the wireless signal with the characteristic of the previously received signal to determine whether to determine the location of the particular device based on the wireless signal.

In one example, the apparatus comprises the data store.

In one example, accessing the record in the data store includes querying another system for records corresponding to the particular device and receiving the record from the other system.

In one example, the apparatus is further to send a wireless signal to communicate the location of the particular device to a remote localization system.

In one example, the apparatus point includes a global positioning system to detect the location of the apparatus.

One or more embodiments may provide a method, a system, a machine readable storage medium, and an apparatus including an Internet of Things (IoT) gateway comprising at least one processor, memory, a wireless communications module to receive wireless signals from devices in an environment, a database storing localization records for a plurality of devices in the environment identifying previously detected locations for each of the particular plurality of different devices, and a localization engine. The localization engine may be executable by the at least one processor to identify presence information corresponding to a first one of the particular plurality of devices, access a particular one of the records from the database corresponding to the first device, determine location of the first device based on the presence information and a comparison of the presence information with information in the particular record, and send data to a remote localization service, wherein the data reports the location of the first device to the localization service.

In one example, the presence information is received from a wireless access point and corresponds to a particular signal received by the wireless access point from the first device, and the location of the first device is based at least in part on location of the wireless access point.

In one example, the presence information identifies characteristics of the particular signal as detected by the wireless access point and the comparison comprises a comparison of the characteristics of the particular signal with characteristics of a previously received signal from the first device identified in the particular record.

In one example, the characteristics comprise one or more of time of travel, signal strength, and angle of arrival of the particular signal.

In one example, the location of the first device is determined based at least in part on a difference between characteristics of the previously received signal and the characteristics of the particular signal.

One or more embodiments may provide a system, a machine readable storage medium, an apparatus (including an access device), and a method to determine, at a wireless access device, a location of the access device, receive, at the access device, a wireless signal from a particular device including presence information corresponding to the particular device, where the particular device lacks self-localization functionality, and determine a location of the particular device based on the location of the access device and the presence information.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
  a communication interface to communicate with a plurality of wireless access points, wherein the plurality of wireless access points is in communication with a plurality of Internet-of-Things (IoT) devices, and wherein each IoT device of the plurality of IoT devices comprises at least one sensor to capture data associated with an environment; and
  a processor to:
  receive, via the communication interface, presence information for a first IoT device of the plurality of IoT devices, wherein the presence information comprises a device identifier, sensor data, and wireless signal information, wherein the wireless signal information corresponds to one or more wireless signals transmitted between the first IoT device and the plurality of wireless access points;

obtain reference locations of the plurality of wireless access points;

determine a current location of the first IoT device, wherein the current location of the first IoT device is determined based on the wireless signal information and the reference locations of the plurality of wireless access points; and store status information for the first IoT device in a database, wherein the status information comprises the device identifier, the sensor data, and the current location of the first IoT device.

2. The apparatus of claim 1, wherein the wireless signal information comprises an indication of wireless signal characteristics of the one or more wireless signals transmitted between the first IoT device and the plurality of wireless access points.

3. The apparatus of claim 2, wherein the wireless signal characteristics comprise one or more of angle of arrival, time of flight, or signal strength.

4. The apparatus of claim 2, wherein the processor to determine the current location of the first IoT device is further to:

triangulate the current location of the first IoT device based on the wireless signal characteristics and the reference locations of the plurality of wireless access points.

5. The apparatus of claim 1, wherein the reference locations of the plurality of wireless access points are based on global positioning system data.

6. The apparatus of claim 1, further comprising a storage device to store the database.

7. The apparatus of claim 1, wherein the processor to store the status information for the first IoT device in the database is further to:

send, via the communication interface, the status information for the first IoT device to a cloud localization service, wherein the status information is to be stored in the database of the cloud localization service.

8. The apparatus of claim 7, wherein the cloud localization service is to provide proximity information to a user device, wherein the proximity information is to indicate a proximity of the user device relative to one or more IoT devices of the plurality of IoT devices.

9. The apparatus of claim 1, wherein:

each IoT device of the plurality of IoT devices is fixed or mobile;

the processor is further to determine whether the first IoT device is fixed or mobile based on the current location of the first IoT device and a location history of the first IoT device, wherein the location history comprises an indication of one or more previous locations of the first IoT device; and the status information for the first IoT device further comprises an indication of whether the first IoT device is fixed or mobile.

10. The apparatus of claim 9, wherein:

the location history further comprises previous wireless signal information for the first IoT device, wherein the previous wireless signal information corresponds to one or more previous wireless signals transmitted between the first IoT device and the plurality of wireless access points; and the processor to determine whether the first IoT device is fixed or mobile based on the current location of the first IoT device and the location history of the first IoT device is further to:

determine whether the first IoT device has changed locations based on a comparison of the wireless signal information and the previous wireless signal information.

11. The apparatus of claim 1, wherein the status information for the first IoT device further comprises a timestamp.

12. The apparatus of claim 1, wherein the status information for the first IoT device further comprises a device type, wherein the device type indicates a make and model of the first IoT device.

13. The apparatus of claim 1, wherein the apparatus is an Internet-of-Things (IoT) gateway.

14. At least one non-transitory machine accessible storage medium having instructions stored thereon, wherein the instructions, when executed on a machine, cause the machine to:

receive, via a communication interface, presence information for a first Internet-of-Things (IoT) device of a plurality of IoT devices, wherein:

the plurality of IoT devices is in communication with a plurality of wireless access points;

each IoT device of the plurality of IoT devices comprises at least one sensor to capture data associated with an environment; and the presence information for the first IoT device comprises a device identifier, sensor data, and wireless signal information, wherein the wireless signal information corresponds to one or more wireless signals transmitted between the first IoT device and the plurality of wireless access points;

obtain reference locations of the plurality of wireless access points;

determine a current location of the first IoT device, wherein the current location of the first IoT device is determined based on the wireless signal information and the reference locations of the plurality of wireless access points; and store status information for the first IoT device in a database, wherein the status information comprises the device identifier, the sensor data, and the current location of the first IoT device.

15. The storage medium of claim 14, wherein the wireless signal information comprises an indication of wireless signal characteristics of the one or more wireless signals transmitted between the first IoT device and the plurality of wireless access points, wherein the wireless signal characteristics comprise one or more of angle of arrival, time of flight, or signal strength.

16. The storage medium of claim 15, wherein the instructions that cause the machine to determine the current location of the first IoT device further cause the machine to:

triangulate the current location of the first IoT device based on the wireless signal characteristics and the reference locations of the plurality of wireless access points.

17. The storage medium of claim 14, wherein the reference locations of the plurality of wireless access points are based on global positioning system data.

18. The storage medium of claim 14, wherein the instructions that cause the machine to store the status information for the first IoT device in the database further cause the machine to:
send, via the communication interface, the status information for the first IoT device to a cloud localization service, wherein the status information is to be stored in the database of the cloud localization service.

19. The storage medium of claim 14, wherein:
each IoT device of the plurality of IoT devices is fixed or mobile;
the instructions further cause the machine to determine whether the first IoT device is fixed or mobile based on the current location of the first IoT device and a location history of the first IoT device, wherein the location history comprises an indication of one or more previous locations of the first IoT device; and
the status information for the first IoT device further comprises an indication of whether the first IoT device is fixed or mobile.

20. The storage medium of claim 19, wherein:
the location history further comprises previous wireless signal information for the first IoT device, wherein the previous wireless signal information corresponds to one or more previous wireless signals transmitted between the first IoT device and the plurality of wireless access points; and
the instructions that cause the machine to determine whether the first IoT device is fixed or mobile based on the current location of the first IoT device and the location history of the first IoT device further cause the machine to:
determine whether the first IoT device has changed locations based on a comparison of the wireless signal information and the previous wireless signal information.

21. The storage medium of claim 14, wherein the status information for the first IoT device further comprises a timestamp.

22. The storage medium of claim 14, wherein the status information for the first IoT device further comprises a device type, wherein the device type indicates a make and model of the first IoT device.

23. A system, comprising:
a plurality of antennas to communicate with a plurality of Internet-of-Things (IoT) devices, wherein each IoT device of the plurality of IoT devices comprises at least one sensor to capture data associated with an environment; and
an IoT gateway device to:
receive, via the plurality of antennas, presence information for a first IoT device of the plurality of IoT devices, wherein the presence information comprises a device identifier, sensor data, and wireless signal information, wherein the wireless signal information corresponds to one or more wireless signals transmitted between the first IoT device and the plurality of antennas;
obtain reference locations of the plurality of antennas;
determine a current location of the first IoT device, wherein the current location of the first IoT device is determined based on the wireless signal information and the reference locations of the plurality of antennas; and
store status information for the first IoT device in a database, wherein the status information comprises the device identifier, the sensor data, and the current location of the first IoT device.

24. The system of claim 23, wherein the wireless signal information comprises an indication of wireless signal characteristics of the one or more wireless signals transmitted between the first IoT device and the plurality of antennas, wherein the wireless signal characteristics comprise one or more of angle of arrival, time of flight, or signal strength.

25. The system of claim 23, wherein the reference locations of the plurality of antennas are based on global positioning system data.

* * * * *